Sept. 21, 1937.  S. FURUKAWA  2,093,719
BIRD TRAP
Filed March 23, 1936  2 Sheets-Sheet 2
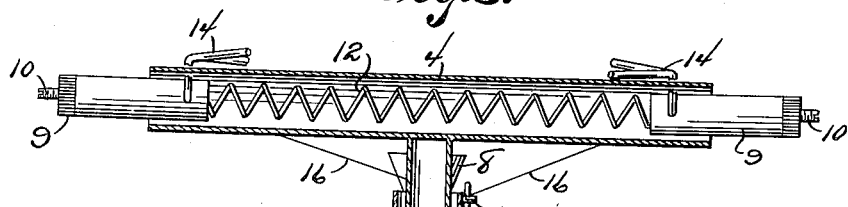
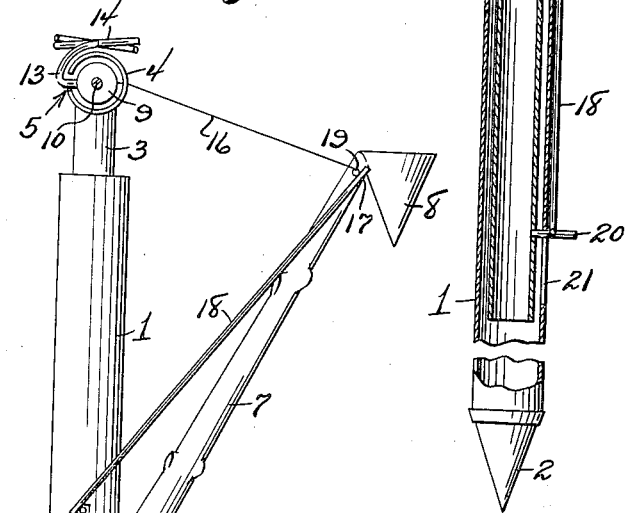
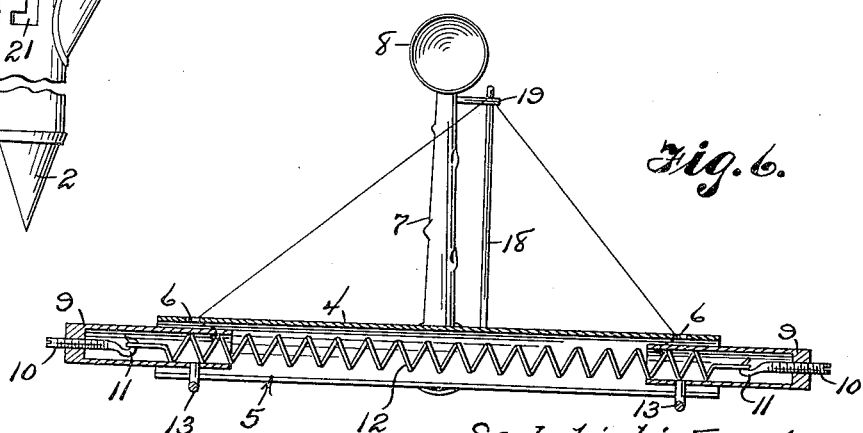
Sadakichi Furukawa
INVENTOR
BY Victor J. Evans & Co.
ATTORNEY Patented Sept. 21, 1937

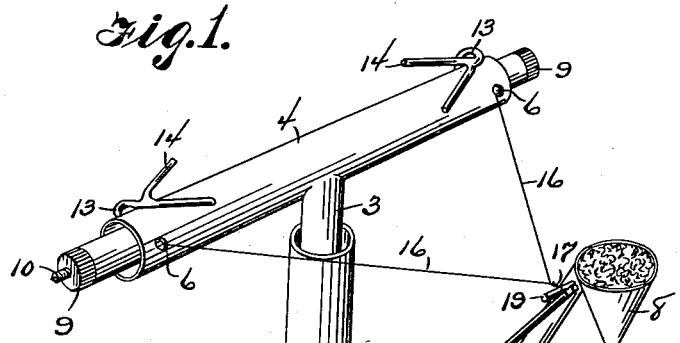
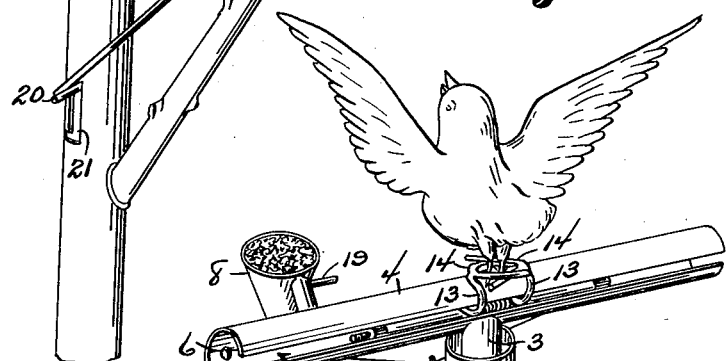
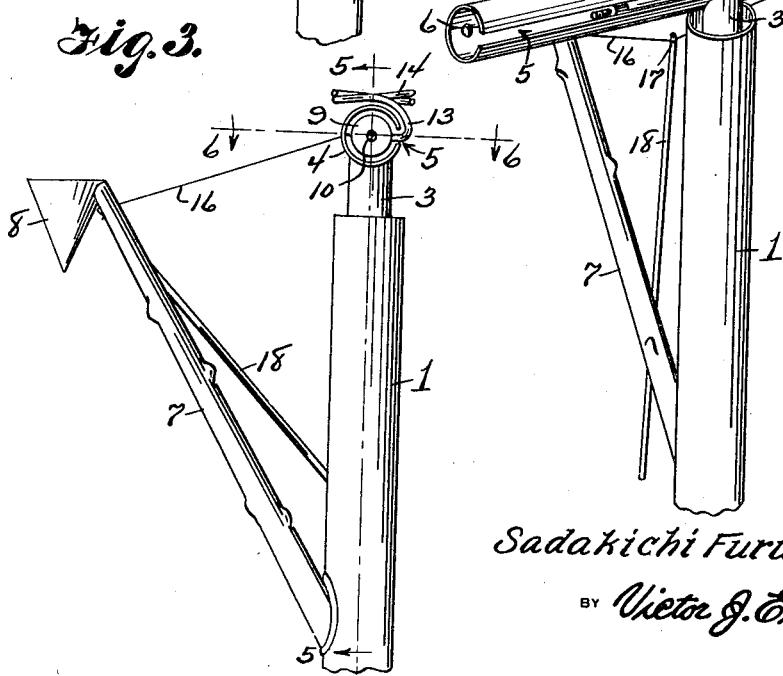

2,093,719

UNITED STATES PATENT OFFICE 2,093,719

BIRD TRAP

Sadakichi Furukawa, Waialua Honolulu, Territory of Hawaii

Application March 23, 1936, Serial No. 70,477

5 Claims. (Cl. 43—58)

This invention relates to bird traps and has for the primary object the provision of a device of this character which may be readily set up for use and is provided with a perch having food arranged adjacent thereto for attracting a bird to said perch and which will yield under the weight of the bird for releasing spring actuated and coacting jaws for the grasping of the legs of the bird standing on said perch thereby trapping the bird.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary perspective view illustrating a bird trap constructed in accordance with my invention.

Figure 2 is a view similar to Figure 1 showing a bird caught by the trap.

Figure 3 is a fragmentary side elevation illustrating the trap in a set position.

Figure 4 is a side elevation illustrating the opposite side of the trap from that shown in Figure 3.

Figure 5 is a sectional view taken on the line 5—5 of Figure 3.

Figure 6 is a sectional view taken on the line 6—6 of Figure 3.

Referring in detail to the drawings, the numeral 1 indicates a tubular post having one end pointed, as shown at 2, for facilitating the insertion of the post into the ground. In use the post is arranged vertically and loosely receives a tubular sleeve 3 having secured to its upper end a horizontally arranged sleeve 4 providing a perch and which is fully open at each end and is provided with a slot 5 extending the full length thereof. The sleeve 4 is also provided with apertures 6 adjacent the ends thereof and located opposite to the slot 5.

An arm 7 is secured to the post and extends outwardly and upwardly therefrom with its upper end terminating substantially in a plane with the perch and has secured thereto a food receptacle 8 in which food is placed for the purpose of attracting birds. The receptacle 8 is located sufficiently close to the perch so that the bird may stand on the perch and obtain food.

Plug-like elements 9 are slidably mounted in the sleeve 4 and have extending therethrough screw threaded shanks 10 of hooks 11. The hooks are connected by a coil spring 12 lying in the sleeve 4. The stems 10 have threaded connection with the plug-like elements so that said stems may be threaded inwardly and outwardly to decrease and increase the tension of the spring. The spring acts to draw the plug-like members in the direction of each other and formed on said plug-like members are arms 13 bent to extend through the slot 5 and terminate in substantially V-shaped jaws 14 overlying the upper face of the perch. When the plug-like members are drawn together by the spring 12, the jaws 14 overlap and coact to grip the legs of a bird, as shown in Figure 2.

Flexible elements 16 are secured to the plug-like elements and are threaded through the openings 6 and connected together, as shown at 17. The connected ends of the flexible elements are secured to one end of a trigger member 18 in the form of a rod. A pin 19 is secured to the arm 7 adjacent the feed receptacle 8 over which are passed the connected ends of the flexible elements drawing one end of the trigger element against the pin 19, the other end of the trigger element being placed against a pin 20 secured to the sleeve 3 and operating through a slot 21 in the post.

In operation, the trap is shown set in Figure 1 with the trigger element 18 engaging the pins 19 and 20 and with the perch 4 positioned in a slightly elevated position with respect to the upper end of the post. The jaws are held adjacent each end of the perch against the action of the spring by the trigger element contacting the pins 19 and 20. With the trap baited with food and set in the manner described, a bird coming to rest on the perch places sufficient weight thereon to cause the pin 20 to disengage with the trigger element and the latter pivots on the pin 19 freeing the jaws which are driven in the direction of each other by the spring moving into overlapping and coacting position, as shown in Figure 2, gripping therebetween the legs of the bird.

Having described the invention, I claim:

1. A bird trap comprising a vertically arranged supporting post, a member slidably mounted in said post, a perch carried by said member, means carried by said perch to grip the legs of a bird coming to rest on said perch, and means for holding the bird gripping means in a set position and releasable by the weight of a bird on the perch.

2. A bird trap comprising a vertically arranged supporting post, a member slidably mounted in said post, a perch carried by said member, bird gripping means carried by said perch, means for holding the bird gripping means in a set position and releasable by the weight of a bird on the perch, an arm secured to the post, and a food receptacle secured to the arm and supported thereby adjacent to the perch.

3. A bird trap comprising a hollow post to be mounted vertically, a member slidable in said post and extending outwardly therefrom at the upper end of said post, a perch secured to the upper end of said member, coacting jaws movably mounted on the perch, means acting to move the jaws into gripping position, and a trigger mechanism connected to said jaws for holding them in set position and releasable by the weight of a bird on the perch, and means for supporting food adjacent the perch.

4. A bird trap comprising a hollow post, a member extending into said post and slidable relative thereto, a hollow perch secured to said member and having openings adjacent the ends and provided with a slot, jaw supporting members slidable in the perch, a coil spring adjustably connected to said jaw supporting members, jaws secured to said jaw supporting members and overlying the perch and each having V-shaped portions adapted to coact in gripping the legs of a bird when resting upon the perch, means for supporting food adjacent the perch, and a trigger mechanism acting to hold the jaws in a set position and releasable by the weight of a bird on the perch.

5. A bird trap comprising a hollow post, a member extending into said post and slidable relative thereto, a hollow perch secured to said member and having openings adjacent the ends and provided with a slot, jaw supporting members slidable in the perch, a coil spring adjustably connected to said jaw supporting members, jaws secured to said jaw supporting members and overlying the perch and each having V-shaped portions adapted to coact in gripping the legs of a bird when resting upon the perch, means for supporting food adjacent the perch, flexible elements secured to said jaw supporting members and threaded through the apertures and connected to each other, a trigger rod having one end secured to the connected ends of the flexible elements, a pin carried by the food supporting means and engageable with the flexible elements and one end of the trigger rod, said post having a slot, and a pin secured to the member slidable in the post and extending through the slot and engaged by the trigger rod.

SADAKICHI FURUKAWA.